US009519877B2

(12) United States Patent
Demiroski et al.

(10) Patent No.: US 9,519,877 B2
(45) Date of Patent: *Dec. 13, 2016

(54) MULTI-ENVIRONMENT CONFIGURATION OF DATA INTEGRATION PROJECTS

(71) Applicant: Microsoft Technology Licensing, LLC, Redmond, WA (US)

(72) Inventors: Bekim Demiroski, Shanghai (CN); David Noor, Redmond, WA (US); Jeffrey Bernhardt, Woodinville, WA (US); Matthew Carroll, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/494,345

(22) Filed: Sep. 23, 2014

(65) Prior Publication Data
US 2015/0012907 A1 Jan. 8, 2015

Related U.S. Application Data

(63) Continuation of application No. 12/816,378, filed on Jun. 15, 2010, now Pat. No. 8,862,545.

(51) Int. Cl.
*G06F 17/30* (2006.01)
*G06Q 10/06* (2012.01)
*H04L 29/08* (2006.01)

(52) U.S. Cl.
CPC ......... *G06Q 10/06* (2013.01); *G06F 17/30563* (2013.01); *H04L 67/10* (2013.01)

(58) Field of Classification Search
None
See application file for complete search history.

(56) References Cited

U.S. PATENT DOCUMENTS 7,028,305 B2   4/2006  Schaefer
7,421,458 B1 * 9/2008  Taylor ............... G06F 17/30607
(Continued)

OTHER PUBLICATIONS

"Data Integration", Retrieved at << http://www.altova.com/mapforce/data-integration.html >>, Retrieved Date: Mar. 29, 2010, pp. 7.

(Continued)

*Primary Examiner* — Bai D Vu
(74) *Attorney, Agent, or Firm* — Aneesh Mehta; Kate Drakos; Micky Minhas

(57) ABSTRACT

A system and method for facilitating execution of one or more data integration projects in multiple environments or an environment that undergoes changes. Each project has a set of project parameters, which are bound to environment variables. Each environment has a corresponding environment representation with environment variables and corresponding values. Each project is mapped to an environment representation. Values of environment variables are provided to projects with corresponding parameters. When one or more projects are changed to a different environment with a different corresponding environment representation, the environment variable values of the new environment representation are provided to the projects. When an environment change is reflected in the environment representation, the changed variable values are provided to mapped projects.

20 Claims, 7 Drawing Sheets

(56) References Cited

U.S. PATENT DOCUMENTS

| | | | | |
|---|---|---|---|---|
| 7,742,939 B1* | 6/2010 | Pham | | G06F 8/77 |
| | | | | 705/7.39 |
| 7,774,720 B1* | 8/2010 | Demetriades | | G06F 17/50 |
| | | | | 715/734 |
| 7,899,756 B2* | 3/2011 | Rizzolo | | G06Q 10/06 |
| | | | | 705/300 |
| 8,108,232 B1* | 1/2012 | Brandes | | G06Q 10/063 |
| | | | | 705/7.11 |
| 8,255,249 B1* | 8/2012 | Anderson | | G06Q 10/06 |
| | | | | 705/7.11 |
| 8,527,940 B2* | 9/2013 | Andersen | | G06F 8/71 |
| | | | | 717/105 |
| 2003/0018952 A1* | 1/2003 | Roetzheim | | G06F 8/20 |
| | | | | 717/101 |
| 2004/0243613 A1* | 12/2004 | Pourheidari | | G06F 17/30864 |
| 2005/0044531 A1* | 2/2005 | Chawla | | G06F 8/71 |
| | | | | 717/122 |
| 2006/0206368 A1* | 9/2006 | Bamberger | | G06Q 10/067 |
| | | | | 705/348 |
| 2006/0265719 A1* | 11/2006 | Astl | | G06F 9/547 |
| | | | | 719/328 |
| 2008/0281904 A1* | 11/2008 | Conrad | | G06Q 10/0631 |
| | | | | 709/203 |
| 2009/0077573 A1 | 3/2009 | Moorthy et al. | | |
| 2009/0119144 A1* | 5/2009 | Goyal | | G06Q 10/0631 |
| | | | | 705/7.12 |
| 2009/0328033 A1 | 12/2009 | Kohavi et al. | | |
| 2010/0070450 A1 | 3/2010 | Barker | | |
| 2011/0113348 A1* | 5/2011 | Twiss | | G06Q 10/10 |
| | | | | 715/753 |

OTHER PUBLICATIONS

"SAS® Data Integration Server", Retrieved at << http://www.sas.com/resources/factsheet/sas-data-integration-server-factsheet.pdf ,Retrieved Date: Mar. 29,2010, Copyright Date: 2009, pp. 8.

Graham, Dumpleton., "Integration with Trac", Retrieved at << http://code.google.com/p/modwsgi/wiki/IntegrationWithTrac , Retrieved Date: Mar. 29, 2010, pp. 8.

* cited by examiner

MULTI-ENVIRONMENT CONFIGURATION OF DATA INTEGRATION PROJECTS

RELATED APPLICATION

This application is a Continuation of prior application Ser. No. 12/816,378, filed Jun. 15, 2010, which is incorporated herein by reference.

BACKGROUND

An extract, translate, and load system (ETL) is a computer-based system that extracts data from a specified data source, transforms the data to convert it into a desired state, and loads the transformed data to a specified destination. An ETL system may be used to integrate two subsystems. Transformations may include operations such as reformatting, sorting, filtering, combining data columns, or other types of modifications.

A data integration project is a computer-based program or collection of programs that perform ETL operations. Data integration projects often depend on the environment in which they are deployed. The environment includes the data systems to which they connect, receive data, and output data. An environment may include a collection of various software or hardware components, such as computers, computer subsystems, files, tables, addresses, or the like. An environment in which a data integration project executes may change, as a result of deploying the project to a different environment, components of the environment changing, or of other reasons. For example, a data integration project may be tested in a test environment and deployed in a production environment. A project may be deployed in multiple environments. Multiple data integration projects may be executed in a common environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate execution of one or more data integration projects in one or more environments. In one embodiment, the system includes, for each project, a set of project parameters and a mapping between each project parameter and an environment variable. In one embodiment, the system includes one or more environment representations, each corresponding to an environment. An environment representation may include a set of environment variables, each environment variable of each environment representation having a value. An environment representation may have environment variables in common with other environment representations, though their values may differ across environment representations. Each project may be mapped to a corresponding environment representation.

In one embodiment, the system provides, for each project, an environment variable value corresponding to each project parameter. In response to a revision of an environment representation's environment variable value, each project having a parameter corresponding to the environment representation and environment variable may be provided with the revised value.

In some configurations, there may be multiple projects mapped to multiple environment representations, such that an environment representation may have more than one corresponding project. In response to a change of an environment variable, the system may determine each project to be affected, and provide the changed value accordingly.

In one embodiment, a project parameter may be specified as an optional parameter. A default value may be specified so that if a corresponding environment variable value is not available, the default value is used as the value of the optional parameter.

In one embodiment, an environment representation may have a reference to another environment representation. The environment representation may receive environment variable values from the other environment representation. A hierarchy of environment representations may be used.

The system facilitates deploying a project in multiple environments, each of which may be the same or differ from each other. It may also facilitate administering changes to an environment in which a project is deployed. The system may also facilitate multiple projects having a common set of one or more environments, or changes to an environment that is common to multiple projects.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
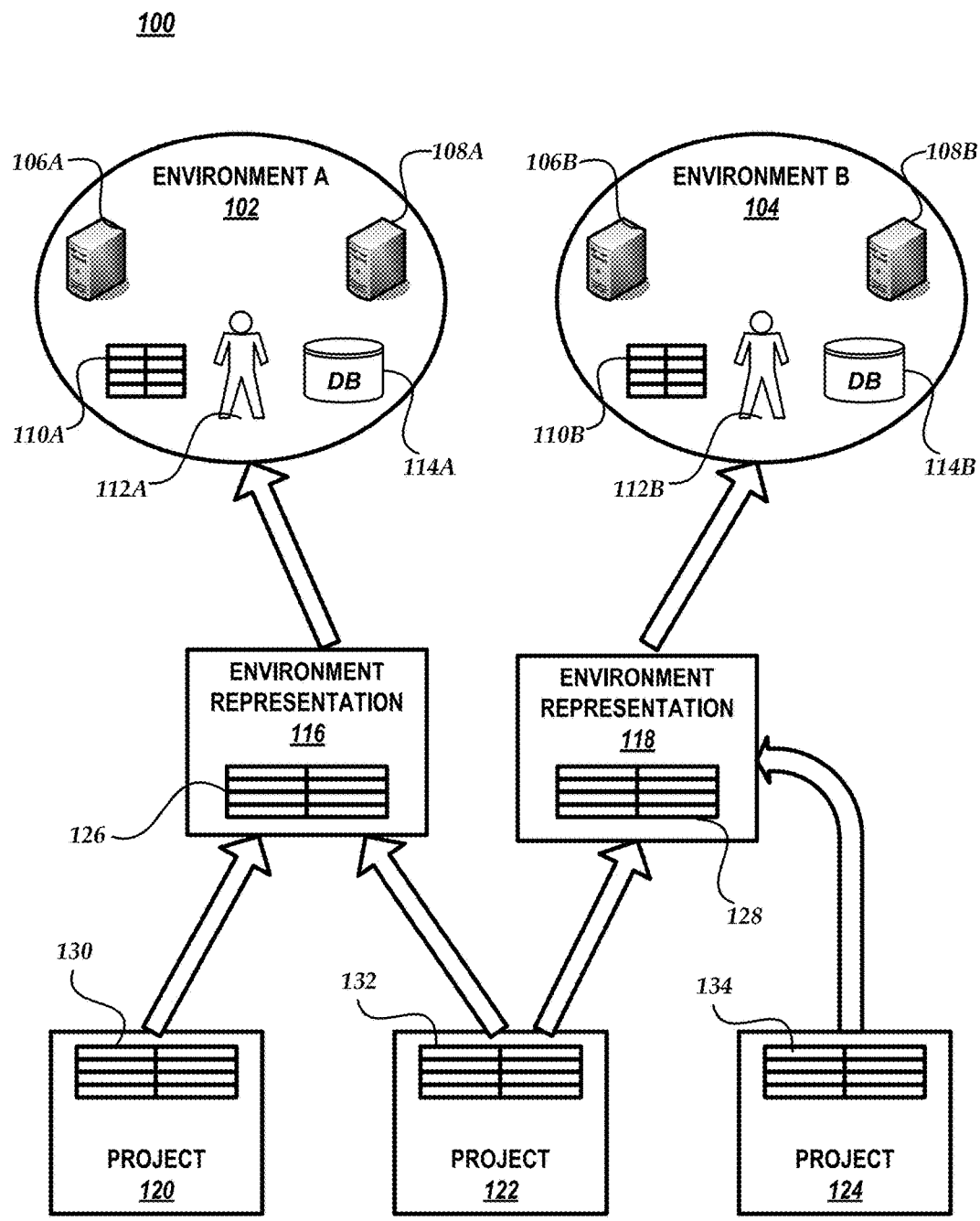
FIG. 1 is a block diagram of an example data integration setting in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an example data integration scenario 100 in which mechanisms described herein may be deployed. Embodiments may be deployed in a variety of scenarios; scenario 100 provides one such example. Scenario 100 may be a portion of a larger data integration setting.

As illustrated, scenario 100 includes two environments: environment A 102 and environment B 104. Each of environment A 102 and environment B 104 includes a set of physical or virtual environment components. Examples of environment components are computers, computer systems or subsystems, computer components, people, data stores, tables, threads, files, service access names or passwords, names of arguments for connecting to a database, various computing resources, or the like. Some components may be specifications that control the operation of a project. Examples of behavioral components are specifications of a number of tests to run, an amount of logging to perform, a maximum number of executable programs to use, or a maximum number of threads or processors to use. Some example components are illustrated, such as source computers 106, destination computers 108, database 114, data tables 110, and administrators 112. Any one or more of these components may differ between environment A 102 and environment B 104. Two environments may differ in one or more components, and may share any number of components. For example, a first environment may differ from a second environment only in a number of threads that are allowed to be used by a project.

In the example scenario 100, environment A 102 and environment B 104 each have a corresponding environment representation 116 and 118, respectively. Environment representations are discussed in further detail herein. Briefly, each environment representation contains data that indicates or represents a specific environment component or feature of the corresponding environment. Examples of such data include names, addresses, capacities, passwords, or the like. In one configuration, environment A 102 and environment B 104 are two environments that exist concurrently. In one configuration, environment A 102 and environment B may be different versions of an environment, existing in different time periods.

Example scenario 100 includes projects 120, 122, and 124. Each of these may be a data integration project, though in some settings other types of computer-based projects may be used. Each project may be associated with one or more environment representations. In the example scenario 100, project 120 is associated with environment representation 116; project 122 is associated with environment representations 116 and 118; project 124 is associated with environment representation 118. Each representation may be concurrent or sequential. For example, instances of project 122 may be associated with environment representations 116 and 118 concurrently, or may be first associated with one, and then the other environment representation.

As illustrated in example scenario 100, there may be various configurations of many-to-many associations between projects and environments. In the illustrated example, environment A 102 has two associated projects 120 and 122; environment B 104 has two associated projects 122 and 124; project 122 has two associated environments, and each of projects 120 and 124 have one associated environments: environment A 102 and environment B 104, respectively. Associations between projects and environments may be dynamic. Thus, at a different point in time, the associations of projects 120, 122, and 124 may differ.

In one embodiment, each of environment representation 116 and 118 may have a collection of data 126 and 128, respectively, which corresponds to environment components. In one embodiment, each of projects 120, 122, and 124 may have configuration data 130, 132, and 134, respectively, which correspond to environment components accessed or employed by each project. Examples of environment representation data and project configuration data are illustrated in FIG. 2 and discussed herein.

Figure 2:
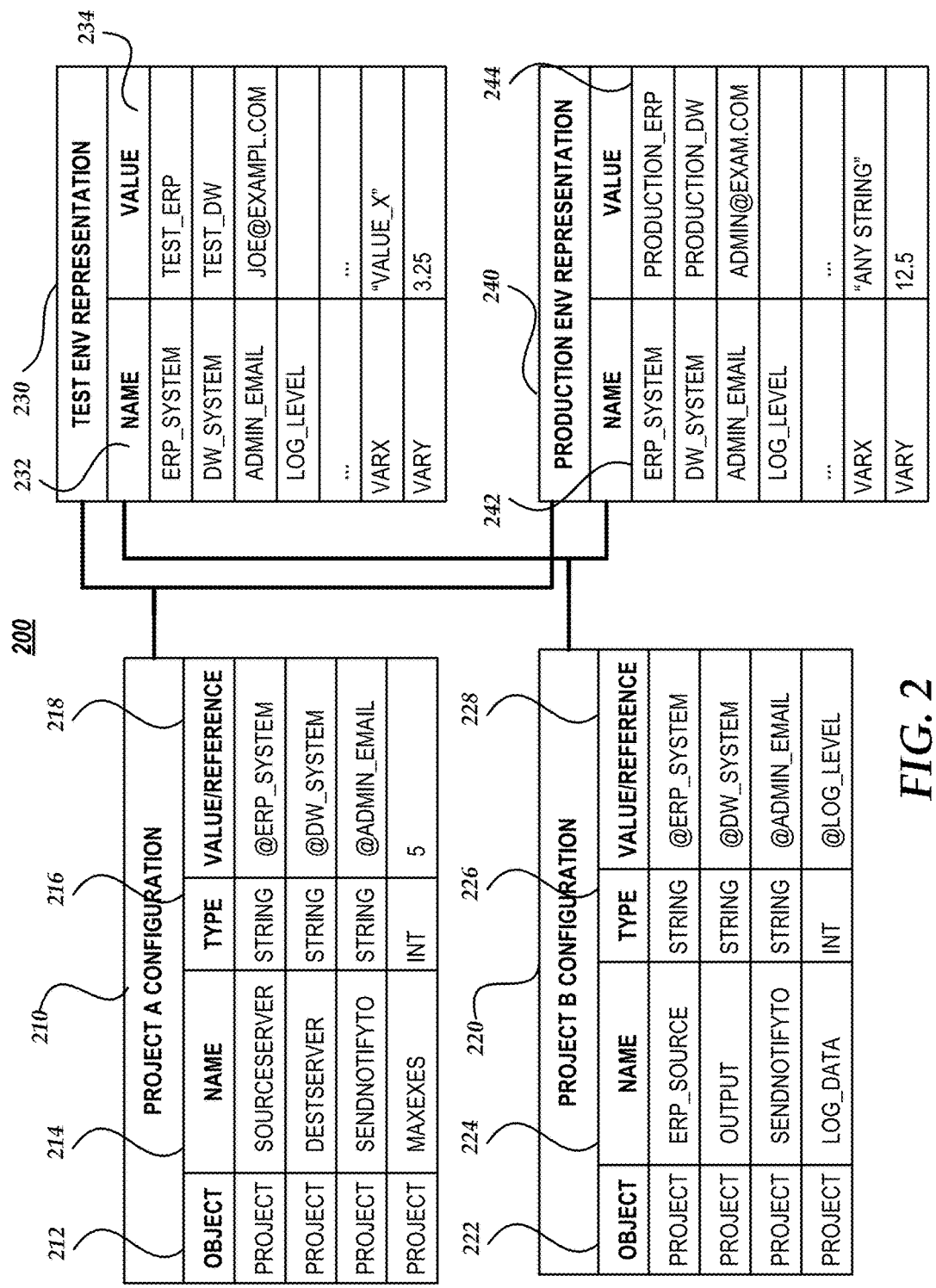
FIG. 2 is a block diagram of example data integration system data that may be configured and used in some embodiments.

FIG. 2 is a block diagram of example data integration system data 200 that may be configured and used in some embodiments. The illustrated example system data 200 includes project A configuration data 210 and project B configuration data 220. Each of these examples of configuration data may correspond to a data integration project, such as projects 120, 122, or 124 or FIG. 1. In one implementation, project configuration data, or a portion thereof may be represented as a data table. In various implementations, the configuration data may be stored as a table or in another manner. For illustrative purposes, the configuration data is referred to herein as a table, in which each row represents a data item. Each data item of the project configuration data is referred to as a project parameter.

Project A configuration data 210 includes a number of fields for each parameter, represented as columns herein. Thus, object field 212 indicates a type of object that the parameter refers to. In the example table of project A configuration data 210, each parameter has a field of "Project," though other types of objects may be used, such as a sub-project.

Name field 214 indicates a name of each parameter. This may be a name that is used internally by the project, or may be descriptive for view by users such as an administrator. Type field 216 indicates an expected type of each parameter. Types may be an identification of any type used by the project, such as string, integer, real, or more specific data types. In some embodiments, a type may be an aggregate type, such as a collection or list of strings or integer values. In one embodiment, a type may specify an object type, and corresponding values may be objects or references to objects.

The value/reference field 218 may indicate a value or a reference to an environment variable that specifies a value. In one embodiment, a "@" character or another character indicates that the field content is a reference to an environment variable, though some implementations may use other mechanisms. In some implementations, all items in this field may be references, so that an indication of a reference is not used. In some implementations, a mechanisms may be used to indicate a value, and omission of the mechanism may indicate a reference.

Project B configuration data 220 includes fields: object field 222, name field 224, type field 226, and value/reference field 228. Each of these fields corresponds to like-named fields as described for project A configuration data 210.

Though not illustrated, additional information may be associated with each parameter of project A configuration data 210 or project B configuration data 220. For example, a field may include a description of each parameter, or other information to facilitate use of the table. A default-value field may specify a value of a parameter to be used by the project in the event that there is not a binding with an environment variable, or the corresponding environment variable does not have a valid value. In one embodiment, a specification in a default-value field indicates that the corresponding parameter is optional.

In the example of FIG. 2, each of test environment representation 230 and production environment representation 240 may correspond to an environment representation such as environment representation 116 or 118. Test environment representation 230 or production environment representation 240 may include collection of data 126 or 128, or a portion thereof. In some implementations, this data may be implemented as a table or in another manner. For illustrative purposes, the environment representation data is referred to herein as a table, in which each row represents an environment data item, referred to herein as an environment variable.

Name fields 232 and 242 indicate a name of each environment variable. Value fields 234 and 244 indicate a value of each environment variable. The value may be a string, integer, real, or any type. Though not illustrated in FIG. 2, additional columns may indicate an environment variable type, a description, or other information to facilitate use of the table.

In one implementation, each parameter of a project configuration table may have a corresponding environment variable to which it is bound. In one embodiment, a binding is indicated by inserting a name of an environment variable in the value/reference field of a project configuration parameter. In the example of FIG. 2, parameter "SourceServer" is bound to environment variable "ERP_System"; parameter "DestServer" is bound to environment variable "DW_System"; and parameter "SendNotifyTo" is bound to environment variable "Admin_Email." As examples of parameters, "SourceServer" may indicate an identifier or address of a data source; "DestServer" may indicate an identifier or address of a destination server; "SendNotifyTo" may indicate an email or messaging address of an administrator. Parameter "MaxExes" does not have corresponding environment variables. Instead, it has a value of 5 included in the value/reference field.

Project B configuration data 220 has similar parameters, though with different names. Thus, "ERP_Source," "Output," and "SendNotifyTo" are similar to "SourceServer," "DestServer," and "SendNotifyTo," respectively. These parameters are similarly bound to the environment variables "ERP_System," "DW_System," and "Admin_Email," respectively. The parameter "Log_Data" has a corresponding environment variable of "Log_Level" in the example of FIG. 2.

In the illustrated example of FIG. 2, project A is associated with test environment and production environment. When deployed with test environment, the values corresponding to each environment variable in test environment representation 230 become the values corresponding to each project parameter that is bound to the environment variable. Thus, parameter "SourceServer," which is bound to environment variable "ERP_System" will have a value of "Test_ERP." Similarly, the parameter "DestServer" will have a value of "Test_DW. The parameter "SendNotifyTo" will have a value of "Joe@exampl.com. In some configurations, different environments may have zero, one, or more environment variable values that differ from other environments.

Production environment representation 240 has environment variables in common with those of test environment representation 230, though the corresponding values may differ. In the example, each of the environment variables of production environment representation 240 has a different value than the corresponding values of test environment representation 230 that are in common with production environment representation 240. An environment variable may be identified by its name. Therefore, environment variables in multiple environment representations having the same name are said to match each other. The environment representations are said to have environment variables in common with each other. In the examples of FIG. 2, all of the illustrated environment variables of each environment representation match corresponding environment variables in the other environment representation. All of these environment variables are said to be in common with each example environment representation. As illustrated, environment variables in common with multiple environment representations may have different values in each environment representation.

When an instance of project A is deployed in the test environment, it therefore uses the set of values illustrated in test environment representation 230. When an instance of project A is deployed in the production environment, it uses the set of values illustrated in production environment representation 240. Thus, the project's configuration is automatically modified for the environment in which it is deployed.

In the illustrated example of FIG. 2, project B is also associated with test environment and production environment. When deployed with each of these environments, the value of each environment variable is used for the corresponding project parameter that is bound to the environment variable, though the set of parameters may differ from that of project A. Specifically, project B includes a parameter "Log_Data" that is bound to the environment variable "Log_Level" and receives an integer value.

Project A and project B may both be deployed in the production environment. In some situations, a value of one or more environment variables may change. For example, an administrator's email address may change, or the name of the ERP system may change, or a password may change. An administrator may change the value of the environment variable to reflect or create the change. In response, the system may automatically change the values of the corresponding parameters in both project A and project B. In some implementations, a change to each project is not needed in order to accommodate the environment change. In some configurations, one or more components of a project may be rebooted, reinitialized, or otherwise prepared for a change of environment. In some configurations, a project may dynamically adjust to the modified environment while continuing to execute.

The set of parameters listed and described in each of project A configuration data 210 and project B configuration data 220 may be considered to be a project contract. A project contract defines a set of configurable parameters exposed by the project. It may facilitate deployment of execution of a project by providing a mechanism for an administrator to bind the project to the environment. A project contract may enable a system to determine whether a project is sufficiently bound to its environment. In some situations, a project contract may facilitate debugging or other analysis of a project or an environment by explicitly indicating the bindings of the project, as well as the bindings of the environment. For example, an administrator desiring to modify an environment may use the set of project contracts to determine how the change may affect projects bound to the environment.

Figure 3:
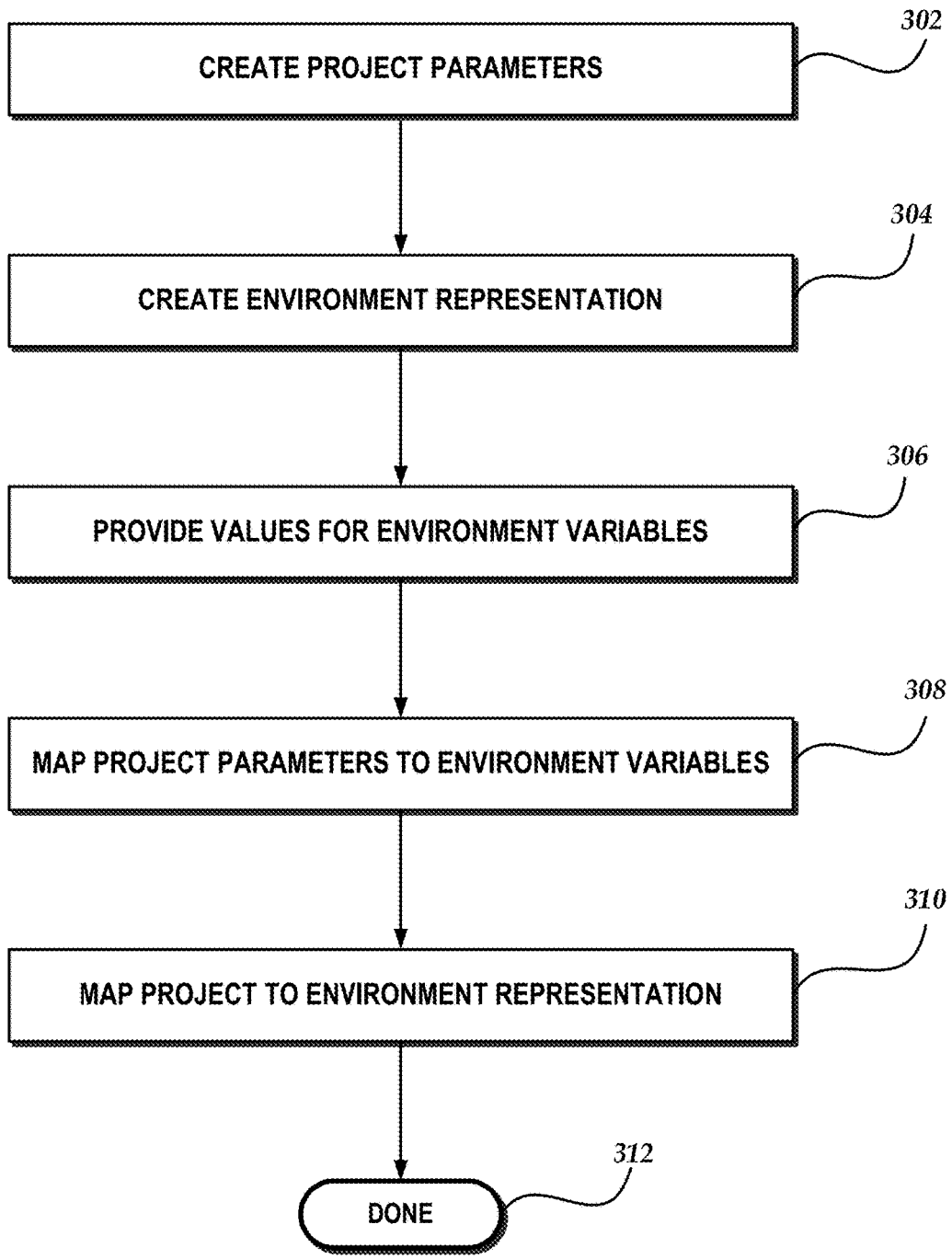
FIG. 3 is a flow diagram illustrating an example embodiment of a process for facilitating the deployment of a project in an environment.

FIG. 3 is a flow diagram illustrating an example embodiment of a process 300 for facilitating the deployment of a project in an environment. The illustrated portions of process 300 may be initiated at block 302, where a set of project parameters is created. In some embodiments, this action may be performed by a developer of the project. Project A configuration data 210 and project B configuration data 220 illustrate examples of sets of project parameters.

The process may flow to block 304, where an environment representation is created. In some embodiments, this action may be performed by a system administrator. An environment representation may include a set of environment variables that correspond to components of the environment. Test environment representation 230 and production environment representation 240 illustrate examples of environment representations.

The process may flow to block 306, where values for each environment variable may be provided. In some implementations, this may include storing a value in a table or other structure, such that a value is stored corresponding to each environment variable. In some implementations, an external process may set values for some environment variables.

The process may flow to block 308, where project parameters are mapped to environment variables. In the example illustrated by FIG. 2, this action may include storing an environment variable name corresponding to each project parameter.

The process may flow to block 310, where the project is mapped to an environment representation, such as test environment representation 230 or production environment representation 240 of FIG. 2. The association between a project and an environment representation defines the environment to which the project is associated.

The process may flow to done block 312, and exit or return to a calling program.

Figure 4:
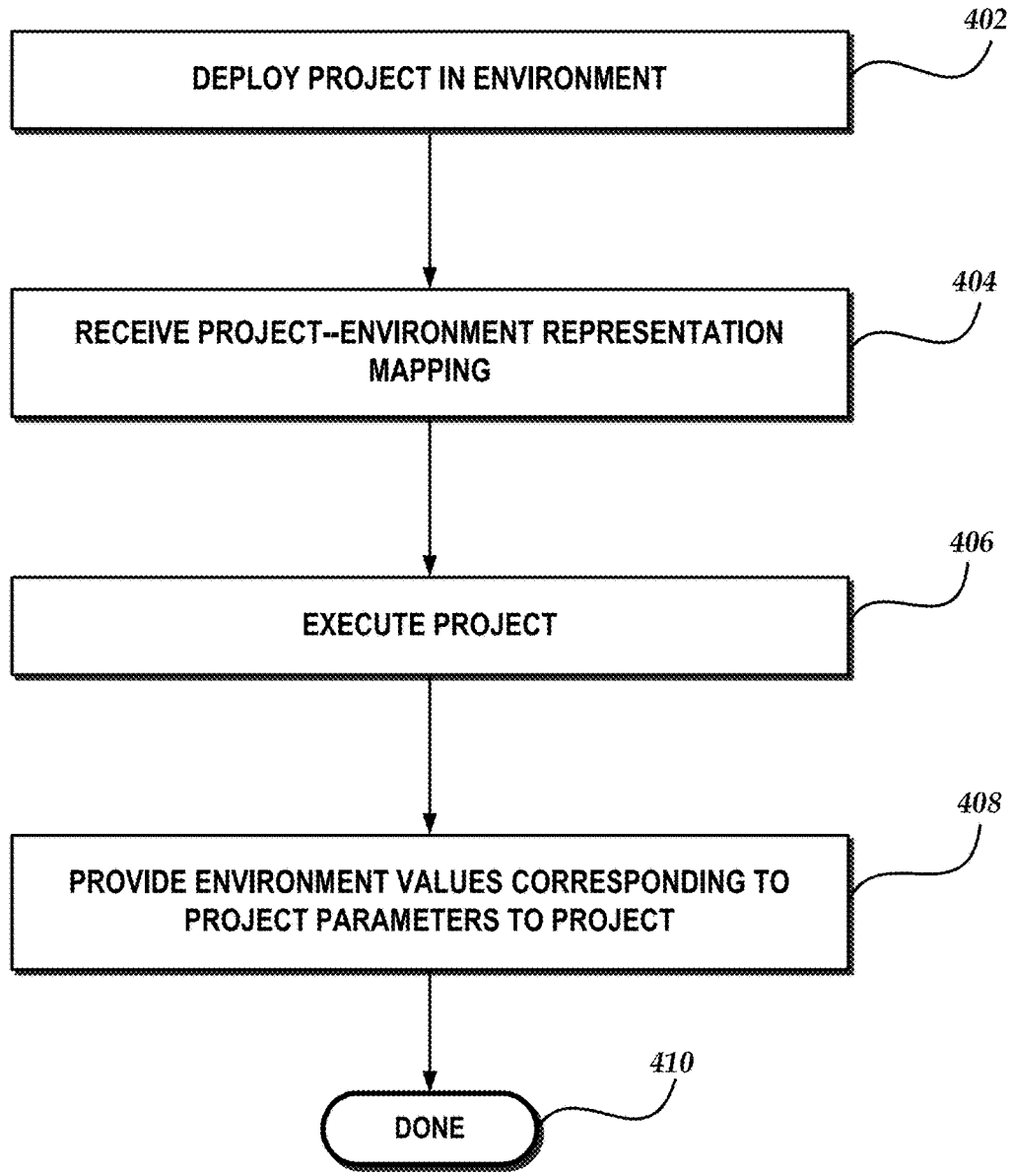
FIG. 4 is a flow diagram illustrating an example embodiment of a process for executing a project.

FIG. 4 is a flow diagram illustrating an example embodiment of a process 400 for executing a project. Process 400 may be performed subsequent to or concurrently with process 300 or a portion thereof. The illustrated portions of process 400 may be initiated at block 402, where the project is deployed in an environment. This action may include one or more of a variety of actions, such as installing files or performing other configuration actions. In some configurations, the project may already be deployed, and the actions of block 402 may be omitted from process 300.

The process may flow to block 404, where the system may receive the project to environment representation mapping. This may be the mapping specified in 310 of FIG. 3. The process may flow to block 406, where the project is executed. In some configurations, this may include initializing the project. In some configurations, the project may have already been initialized.

The process may flow to block 408, where environment variable values corresponding to project parameters may be provided to the project. This may be performed in response to one or more requests from the project, or the values may be delivered to the project in another manner. The actions of block 408 may include retrieving the values bound to each environment variable and providing each value for a corresponding project parameter. The process may flow to done block 410, and exit or return to a calling program.

In some configurations, one or more of the actions of processes 300 or 400 may be omitted. For example, in some configurations, some of the actions may have been previously performed. In some implementations, the ordering of actions described herein may vary, or be performed concurrently. As discussed, a system may support multiple projects in an environment. Thus, processes 300 or 400 may be performed sequentially or concurrently with respect to multiple projects.

Figure 5:
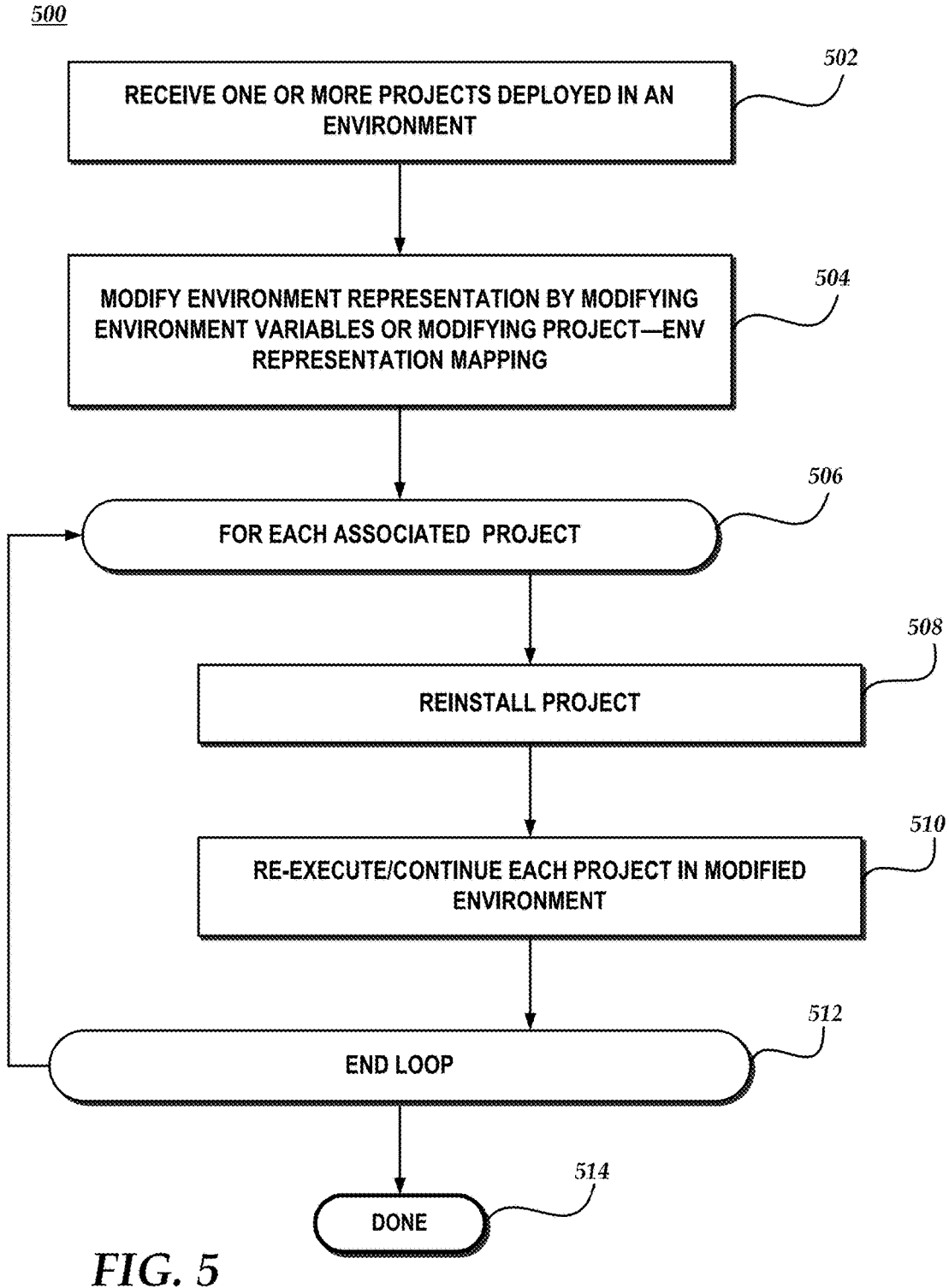
FIG. 5 is a flow diagram illustrating an example embodiment of a process for modifying environments with respect to associated projects.

FIG. 5 is a flow diagram illustrating an example embodiment of a process 500 for modifying environments with respect to associated projects. In some configurations, process 500 may be performed after process 300 or 400, or combined with process 300 or 400. The illustrated portions of process 500 may be initiated at block 502, where one or more projects deployed in an environment may be received. Receiving a project may include receiving an identifier, link, program code, or other data that corresponds to a project. Projects 120 and 122 of FIG. 1 are examples of projects that are deployed in and associated with environment A 102 of FIG. 1.

The process may flow to block 504, where an environment representation corresponding to the associated project is modified. Modification may include modifying one or more environment variable values of a representation. Modification may include modifying the mapping between a project and an environment representation so that the project maps to a different environment representation. A result of the action of block 504 is that the project's view of the environment is modified.

The process may flow to loop 506, which iterates for each project affected by the change of block 504. This may include each project that is mapped to the environment representation resulting from block 504. Thus, in one configuration, this may be a set of projects which have had mappings to environment representations changed as a result of block 504. In the illustrated embodiment, loop 506 includes blocks 508 and 510, and is terminated by block 512. Within each iteration of loop 506, a project being processed is referred to as the "current" project.

The process may flow to block 508, where the current project may be reinstalled. This action may be omitted in some configurations. It may occur, for example, in a configuration in which a change in environment includes changing a computing device upon which the project, or a portion thereof, is being executed.

The process may flow to block 510, where the current project may be continued or re-executed in the modified environment. Re-executing a project may be selectively performed based on the type of environment changes that have been made, logic of the project, or a current status of the project. In some configurations, the current project may continue executing from its current state, revert to a prior state, perform some initialization actions, or otherwise continue without being re-executed from an initial state.

The process may flow to block 512, and selectively perform another iteration of loop 506, based on whether there is another project to be processed. Upon exiting loop 506, the process may flow to done block 514.

Figure 6A:
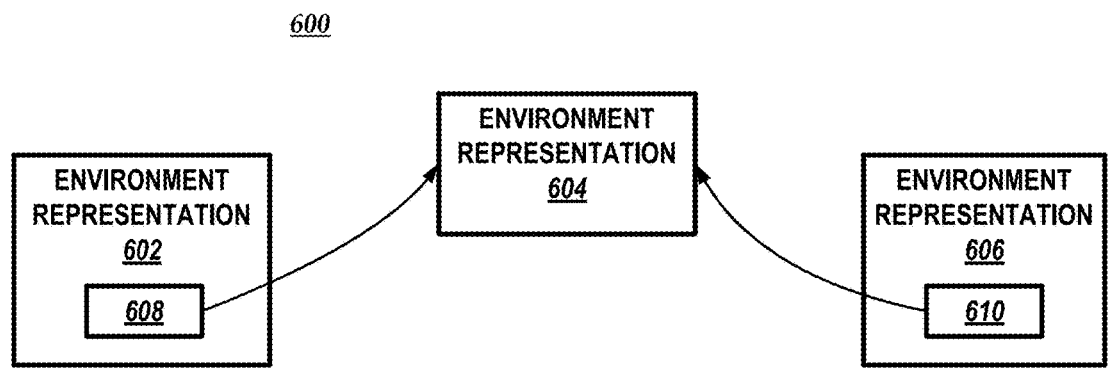
FIGS. 6A-B are block diagrams illustrating mechanisms in which environment representations may be organized and related to other environment representations.
Figure 6B:
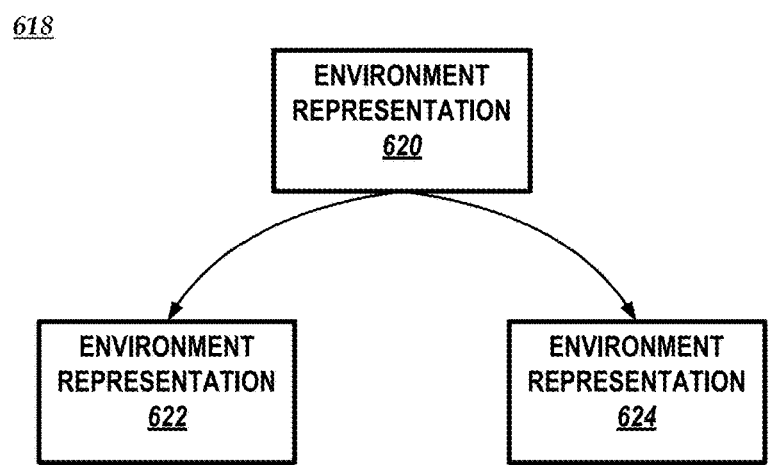

FIGS. 6A-B are block diagrams illustrating mechanisms in which environment representations may be organized and related to other environment representations. FIG. 6A includes example configuration 600 with environment representations 602 and 606, each of which includes link 608 or 610, respectively. The link refers to environment representation 604. In one embodiment, a system may consider environment representation 604 to be included within each of environment representations 602 and 606. An environment representation may include zero, one, or more links, and linked environment representations may include links of other environment representations, forming a directed graph of linked environment representations.

FIG. 6B includes example configuration 618 with environment representation objects 622 and 624, each of which is a child of environment representation object 620. Each child environment representation object may inherit environment variables or values of environment variables from a parent or ancestor object. In some implementations, a child object may add new environment variables or override values of inherited environment variables. In some implementations, a child object may inherit qualities from multiple parent objects. In an example of a hierarchical structure, a parent environment representation object may correspond to a generic test environment; child environment representation objects may correspond to variations of the generic test environment.

In embodiments that provide mechanisms for a hierarchical structure or linking of environment representations, a change to an environment representation, such as environment representation 604 or environment representation object 620, may affect each project that is associated with it, directly or indirectly. Process 500 may include determining the various projects that are affected by an environment representation change, and iterating loop 506 for each one.

Figure 7:
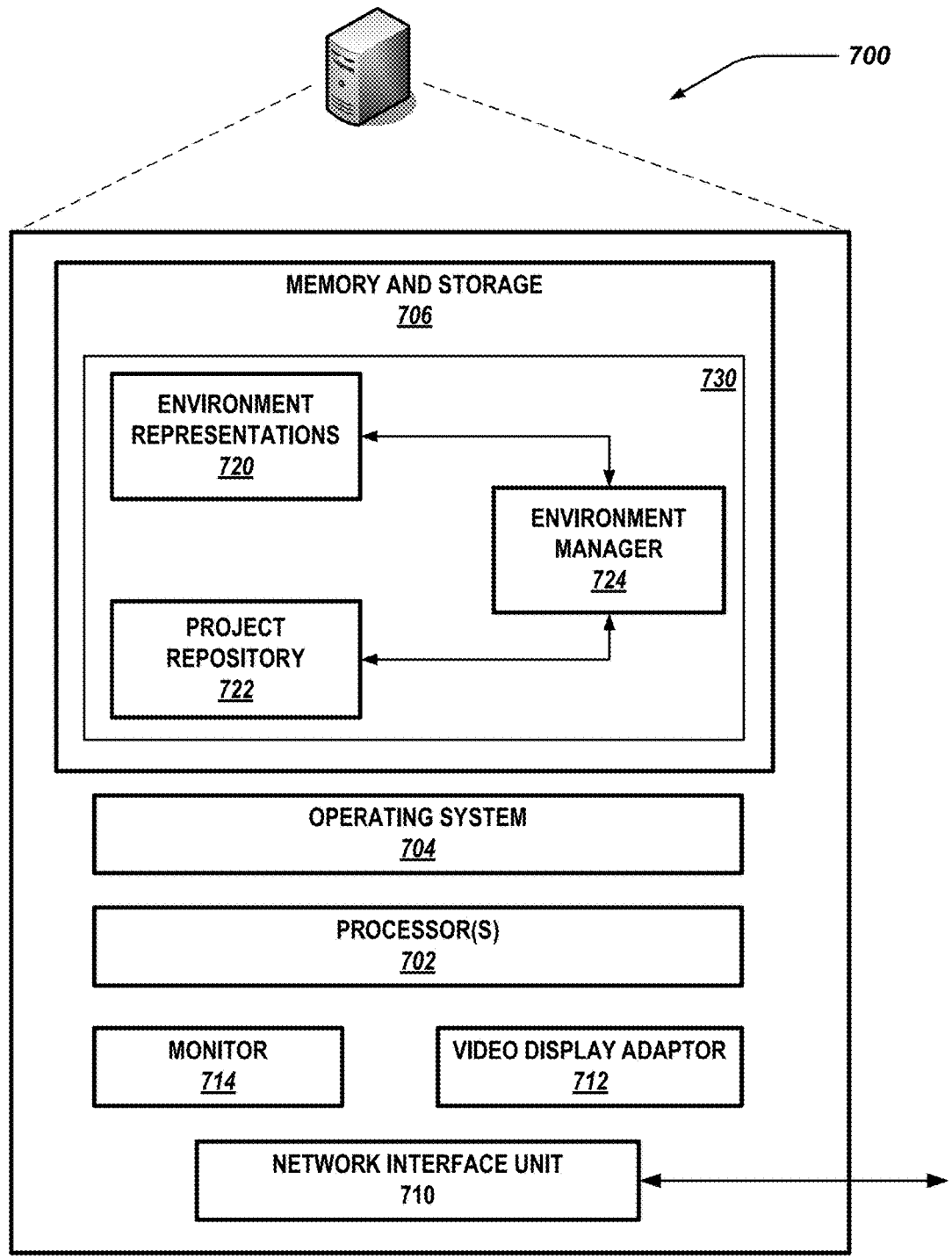
FIG. 7 is a block diagram showing one embodiment of a computing device, illustrating selected components of a computing device that may be used to perform functions described herein.

FIG. 7 is a block diagram showing one embodiment of a computing device 700, illustrating selected components of a computing device that may be used to implement mechanisms described herein, including processes 300, 400, or 500. Computing device 700 may include many more components than those shown, or may include less than all of those illustrated. Computing device 700 may be a standalone computing device or part of an integrated system, such as a blade in a chassis with one or more blades.

As illustrated, computing device 700 includes one or more processors 702, which perform actions to execute instructions of various computer programs. In one configuration, each processor 702 may include one or more central processing units, one or more processor cores, one or more ASICs, cache memory, or other hardware processing components and related program logic. As illustrated, computing device 700 includes an operating system 704. Operating system 704 may be a general purpose or special purpose operating system. The Windows® family of operating systems, by Microsoft Corporation, of Redmond, Wash., are examples of operating systems that may execute on computing device 700.

Memory and storage 706 may include one or more of a variety of types of non-transitory computer storage media, including volatile or non-volatile memory, RAM, ROM, solid-state memory, disk drives, optical storage, or any other medium that can be used to store digital information.

Memory and storage 706 may store one or more components described herein or other components. In one embodiment, memory and storage 706 stores a collection of environment representations 720 and project repository 722. Project repository 722 may include one or more projects, such as project 120, 122, or 124 of FIG. 1. In one embodiment, memory and storage 706 stores environment manager 724. Environment manager 724 may include program instructions, executable by a processor, that implement at least a portion of the mechanisms described herein, including processes 300, 400, or 500. Environment manager 724 may, for example, retrieve values of environment variables associated with an environment representation and provide the values corresponding to each project parameter to each project that defines the parameter and is mapped to the environment representation. Environment manager 724 may, in response to an environment change, determine projects that are affected by the change and facilitate each project using the modified components of the environment.

Environment manager 724, environment representations 720, and project repository 722 are components of a system 730 that may implement mechanisms described herein. Any one or more of these components may be moved to different locations in RAM, non-volatile memory, or between RAM and non-volatile memory by operating system 704 or other components. In some configurations, these components may be distributed among one or more computing devices. In one embodiment, one or more computing devices 700 each including system 730 or a portion thereof may form a computing system for facilitating execution of one or more data integration projects in multiple environments or an environment that undergoes changes.

Computing device 700 may include a video display adapter 712 that facilitates display of program code or other information to a user. Though not illustrated in FIG. 7, computing device 700 may include a basic input/output system (BIOS), and associated components. Computing device 700 may also include a network interface unit 710 for communicating with a network. Software components, such as those stored in memory and storage 706, may be received via transitory media and network interface unit 710. Computing device 700 may include one or more display monitors 714. Embodiments of computing device 700 may include one or more input devices 716, such as a keyboard, pointing device, audio component, microphone, voice recognition component, or other input/output mechanisms.

It will be understood that each block of the flowchart illustration of FIGS. 3-5, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based system for facilitating execution of a plurality of computer programs in a plurality of environments, the computer-based system comprising:
   a memory and a processor that are respectively configured to store and execute instructions, including instructions for causing the computer-based system to perform operations, the operations comprising:
   receiving, for each computer program, a set of computer program parameters, each computer program parameter having a binding to a corresponding environment variable, wherein the computer-based system also has: a collection of two or more environment representations, each environment representation including a corresponding set of environment variables, each environment variable of each environment representation having a corresponding value; and
   a mapping between each computer program and a corresponding environment representation;
   providing to each computer program a value for each parameter having a corresponding environment variable;
   in response to a change of a value corresponding to an environment variable in an environment representation, determining each computer program corresponding to the environment representation and the environment variable; and
   providing the change of value to each determined computer program.

2. The computer-based system of claim 1, wherein in response to receiving the change of value, each computer program adjusts to the change of value while continuing to execute.

3. The computer-based system of claim 1, wherein the computer-based system also has:
   a plurality of bindings between each parameter of each computer program and a corresponding environment variable of a corresponding environment representation, the bindings employed to associate values of each environment representation with corresponding parameters of each computer program.

4. The computer-based system of claim 1, wherein the two or more environmental representations include a first environmental representation and a second environmental representation organized in a hierarchical structure, and wherein the first environmental representation inherits at least one value from the second environmental representation.

5. The computer-based system of claim 1, the two or more environment representations including a first environment representation having a reference to a second environment representation, the method further comprising enabling a computer program mapped to the first environment representation to receive values of environment variables specified in the second environment representation.

6. The computer-based system of claim 1, wherein in response to receiving the change of value, each computer program adjusts to the change of value without re-executing from an initial state.

7. The computer-based system of claim 1, wherein the set of computer program parameters corresponding to a first computer program have a specification of a default value for a first computer program parameter, and wherein the operations further include determining whether to provide the default value to the first computer program based on whether a corresponding environment variable exists or has an assigned value.

8. A computer-based method of facilitating execution of a plurality of computer programs in a plurality of environments, the method comprising:
   a) receiving, for each computer program, a set of parameters and a mapping between each parameter and a corresponding environment variable;
   b) receiving a collection of two or more environment representations, each environment representation including a set of environment variables including at least one environment variable in common with another environment representation, each environment variable of the set of environment variables having a corresponding value;
   c) receiving, for each computer program, a mapping between the computer program and a corresponding environment representation;
   d) providing, for each computer program, an environment variable value corresponding to each project parameter associated with the computer program, based on the mapping between the computer program and the corresponding environment representation; and e) in response to a revised value of a changed environment variable of the set of environment variables corresponding to an environment representation, providing, for each computer program having a parameter corresponding to the environment representation and the environment variable, the revised value.

9. The computer-based method of claim 8, the two or more environment representations including a first environment representation having a reference to a second environment representation, the method further comprising enabling a computer program mapped to the first environment representation to receive values of environment variables specified in the second environment representation.

10. The computer-based method of claim 8, further comprising in response to receiving the revised value, continuing execution of at least one of the computer programs without re-executing the at least one of the programs from an initial state.

11. The computer-based method of claim 8, wherein the method further comprises:
adjusting each computer program to the revised value.

12. The computer-based method of claim 8, wherein the method further comprises:
adjusting at least one of the computer programs to the revised value without reinitializing that computer program.

13. The computer-based method of claim 8, wherein the two or more environmental representations include a first environmental representation and a second environmental representation organized in a hierarchical structure, and wherein the first environmental representation inherits at least one value from the second environmental representation.

14. The computer-based method of claim 8, wherein the set of parameters for a first computer program has a specification of a default value for a first computer program parameter, and wherein the method further comprises determining whether to provide the default value to the first computer program based on whether a corresponding environment variable exists or has an assigned value.

15. A computer-readable storage medium comprising computer program instructions for facilitating execution of a computer program, the program instructions executable by one or more processors to perform actions including:
a) receiving a first environment representation including a first set of environment variables;
b) receiving a first mapping between a set of computer program parameters and the first environment representation, the first mapping indicating a correspondence between each computer program parameter of the set of computer program parameters and a corresponding environment variable of the first set of environment variables;
d) providing to the computer program an environment variable value corresponding to each computer program parameter associated with the computer program, based on the first mapping;
e) receiving a second mapping between the computer program and a second corresponding environment representation;
f) in response to receiving the second mapping, enabling the computer program to execute in an environment represented by the second corresponding environment representation.

16. The computer-readable storage medium of claim 15, the first environment representation and the second environment representation organized in a hierarchy, the second environment representation receiving at least one environment variable from the first environment representation.

17. The computer-readable storage medium of claim 15, wherein the by one or more processors also employ:
a plurality of bindings between parameters of the computer programs and corresponding environment variables.

18. The computer-readable storage medium of claim 17, wherein the actions also include:
employing the bindings to associate values of the environment representations with corresponding parameters.

19. The computer-readable storage medium of claim 15, wherein the executing in the environment represented by the second corresponding environment representation is performed without re-executing the computer program from an initial state.

20. The computer-readable storage medium of claim 15, wherein the set of computer program parameters corresponding to a first computer program has a specification of a default value for a first computer program parameter, and wherein the actions also include determining whether to provide a default value to the first computer program based on whether a corresponding environment variable exists or has an assigned value.

* * * * *